United States Patent [19]
Harris et al.

[11] Patent Number: 5,628,092
[45] Date of Patent: May 13, 1997

[54] EYEWEAR RETAINER

[76] Inventors: Tina Harris, 1149 S. Keniston Ave., Los Angeles, Calif. 90019; Lisa Quon, 11225 La Maida St. #3, No. Hollywood, Calif. 90601

[21] Appl. No.: 447,624

[22] Filed: May 23, 1995

[51] Int. Cl.⁶ ................................................. G02C 3/00
[52] U.S. Cl. .................................... 24/3.3; 24/302
[58] Field of Search ................ 24/3.3, 3.4, 3.1, 24/298–302, 16 PB; 351/155–157

[56] References Cited

U.S. PATENT DOCUMENTS

| | | | |
|---|---|---|---|
| 3,038,376 | 6/1962 | Kancepolsky | 351/157 |
| 3,502,396 | 3/1970 | Greenberg | 351/157 |
| 3,913,178 | 10/1975 | Ballin | 24/16 PB |
| 4,133,604 | 1/1979 | Fuller . | |
| 4,541,696 | 9/1985 | Winger et al. . | |
| 4,696,556 | 9/1987 | Perry, III | 351/157 |
| 4,818,094 | 4/1989 | Lyons | 351/157 |
| 4,820,036 | 4/1989 | Seet | 351/157 X |
| 5,092,667 | 3/1992 | Bagley . | |
| 5,157,425 | 10/1992 | Liu | 24/3.3 X |
| 5,367,347 | 11/1994 | Wilson et al. | 24/3.3 X |
| 5,369,452 | 11/1994 | Williams | 24/3.3 X |

FOREIGN PATENT DOCUMENTS

| | | | |
|---|---|---|---|
| 2605756 | 4/1988 | France | 351/156 |
| WO87/01820 | 3/1987 | WIPO | 351/157 |
| WO91/14195 | 9/1991 | WIPO | 351/156 |

*Primary Examiner*—James R. Brittain
*Attorney, Agent, or Firm*—Pretty, Schroeder, Brueggemann & Clark

[57] ABSTRACT

The invention provides an improved eyewear retainer in which a strap that is attached to the earpieces of the eyewear and looped around the head of a human wearer to retain the eyewear snugly and securely in place on the wearer's head. The strap includes at least one hinge, a region of the strap having increased flexibility in comparison with a region adjacent to the hinge. In preferred embodiments, the hinge is formed by pulling an end of the strap through an aperture through the strap's material. In a particularly preferred embodiment, the strap comprises two strap segments, each of which includes a hinge formed by passing an end of the strap segment through a separate aperture in the material of the strap segment. Each of the strap segments is provided with an attachment for securing the strap segment to an earpiece of the eyewear. The two strap segments are held together by a fastener, which may be formed of a hook and loop material. The strap may be formed of a material having two sides, each of which is provided with a different color or pattern so that a striking and distinctive visual appearance is provided thereby.

11 Claims, 2 Drawing Sheets

EYEWEAR RETAINER

BACKGROUND OF THE INVENTION

The present invention relates generally to apparel and sporting goods. More particularly, the invention provides an improved eyewear retainer adapted to hold eyeglasses or other eyewear securely on the head of a wearer.

Eyewear retainers are known in the art. One general type of eyewear retainer includes a length of strap material secured to each earpiece of the eyewear. The strap material forms a loop that can be placed over the wearer's head at least to hold the eyewear around the wearer's neck to keep it from falling to the ground. Preferably, the effective length of the strap can be adjusted to hold the eyewear snugly and securely in place on the wearer's head.

A continuing need exists, therefore, for an eyewear retainer having a strap whose effective length can be adjusted to fit an individual wearer. Preferably, features would be provided to enhance the flexibility and comfort of the strap. Moreover, the eyewear retainer should be simple and economical to assemble. Finally, the eyewear retainer should be attractive and visually appealing. These and other features are provided by the eyewear retainer of the invention, a preferred embodiment of which is described in further detail below.

SUMMARY OF THE INVENTION

The invention provides an improved eyewear retainer of the type that includes a strap that attaches to the earpieces of the eyewear. The strap loops around the head of a human wearer to retain the eyewear snugly and securely in place on the wearer's head. The strap includes at least one "hinge", which is defined as a region of the strap having increased flexibility in comparison with a region adjacent to the hinge. In preferred embodiments, the hinge is formed by pulling an end of the strap through an aperture through the strap's material. The enhanced flexibility provided by the hinge significantly increases the comfort of the strap to the wearer.

In a particularly preferred embodiment, the strap comprises two strap segments, each of which includes a hinge formed by passing an end of the strap segment through a separate aperture in the material of the strap segment. Each of the strap segments is provided with an attachment for securing the strap segment to an earpiece of the eyewear. The two strap segments are held together by a fastener, which can be formed of an appropriate hook and loop material. The strap may be formed of a material having two sides, each of which is provided with a different color or pattern so that a striking and distinctive visual appearance is provided thereby.

As described herein, the invention provides an improved eyewear retainer having enhanced flexibility and comfort to the wearer. The eyewear retainer has a striking and attractive visual appearance and is simple and economical to assemble and use.

Other features and advantages of the invention will become apparent from the following detailed description of the preferred embodiment and the accompanying drawings, which illustrate by way of example the principles of the invention.

DESCRIPTION OF THE PREFERRED EMBODIMENTS

Figure 1:
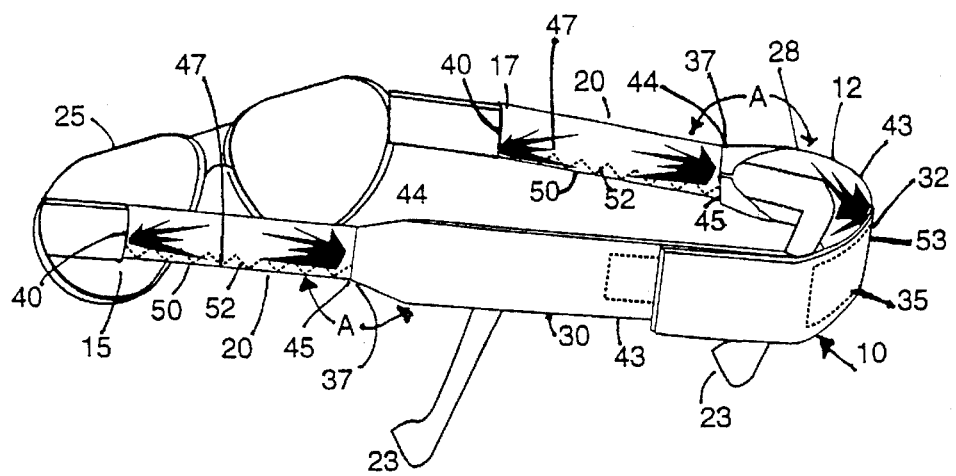
FIG. 1 depicts an eyewear retainer according to the invention and a pair of eyewear to which the retainer is fitted.

The invention provides an improved eyewear retainer 10 of the type depicted in FIG. 1. As depicted therein, the eyewear retainer includes a strap 12. The strap has a first strap end 15 and a second strap end 17. Each strap end includes an attachment 20. Each attachment secures the associated strap end to an earpiece 23 of the eyewear 25. The eyewear retainer forms a loop that can be positioned around the head of a person wearing the eyewear. The strap usually includes some means for adjusting the loop's effective size to ensure that the strap holds the eyewear snugly and securely in position on the wearer's head.

Figure 2:
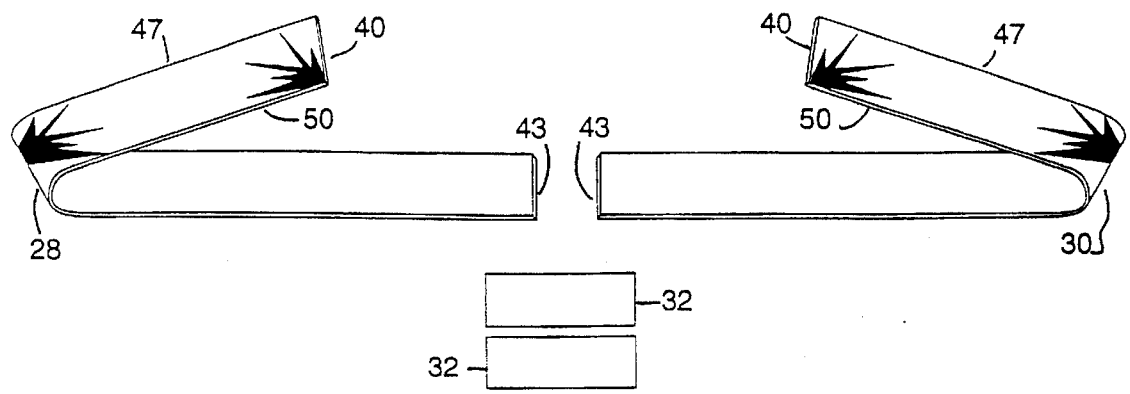
FIG. 2 shows the constituent parts of which the eyewear retainer depicted in FIG. 1 is constructed.

The construction of an improved eyewear retainer 10 according to the invention is depicted in FIGS. 2–6. As shown in FIG. 2, a particular embodiment of the eyewear retainer is constructed principally of a first strap segment 28, a second strap segment 30, and matching patches of hook material 32 and loop material 35. The strap segments can be formed of a waterproof, somewhat elastic synthetic material such as that sold under the trademark NEOPRENE. The matching hook and loop materials can be of the type sold under the trademark VELCRO.

Figure 3:
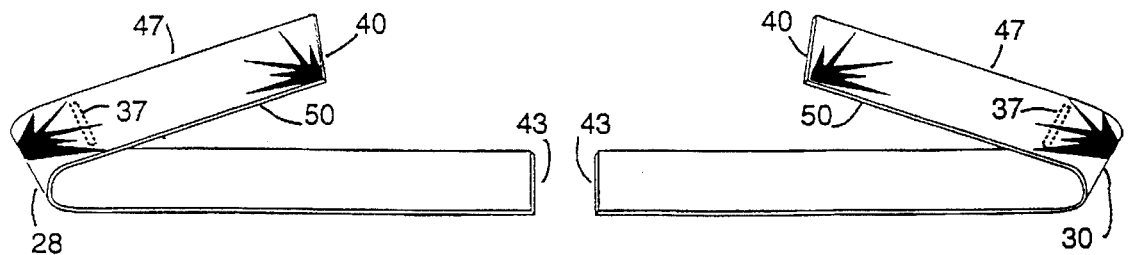
FIGS. 3–6 depict steps involved in the construction of the eyewear retainer depicted in FIG. 1.

As shown in FIG. 3, apertures 37 in the form of small vertical slits are cut or otherwise formed through the material of each strap segment 28 and 30. In the following description, one end of each strap segment is defined as a "distal" end of the strap segment, and the other end as a "medial" end of the strap segment. When the strap segments are joined together, the distal ends 40 will be at each end of the assembled eyewear retainer 10 and the medial ends 43 will be joined together in the middle of the eyewear retainer.

The apertures 37 are located somewhere along the length of each strap segment, typically nearer the distal end 40 of the strap segment than the medial end 43. As an example, the apertures can be formed approximately one and one-half inches from the distal end of each strap segment. This would ordinarily leave several inches of material between the aperture and the medial end of the strap segment.

Figure 4:
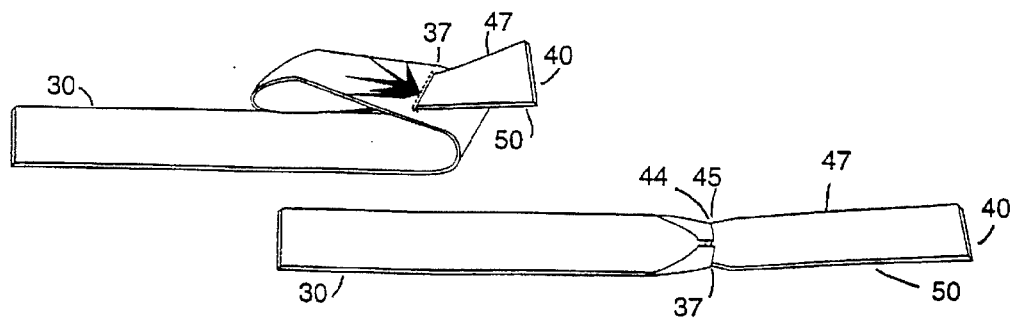

As depicted in FIG. 4, the distal end 40 of each strap segment is turned back and pulled through the aperture 37 of that strap segment. The ends of the strap segments are then pulled tight, thereby forming a restriction 44, a region of decreased width, in the vicinity of the aperture. As will be described further below, this restriction functions as a hinge 45, which significantly enhances the functionality and appearance of the eyewear retainer 10.

Figure 5:
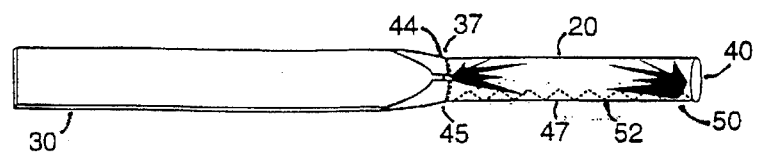
Figure 6:
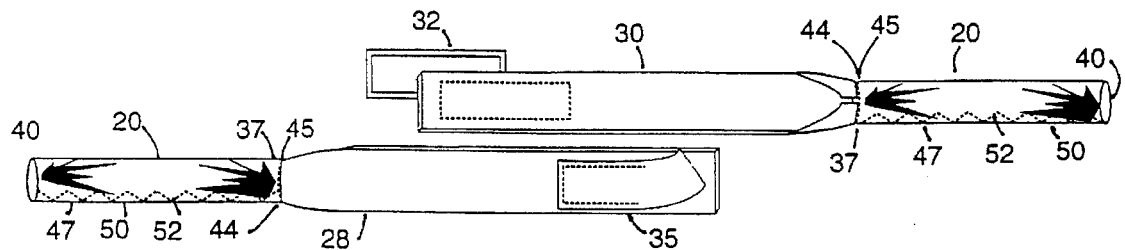

As shown in FIG. 5, the top edge 47 and bottom edge 50 of the distal end 40 of each strap segment are then stitched together along a seam 52. This forms the attachment 20, into which the earpiece 23 of the eyewear 25 can be slipped to be held snugly as depicted in FIG. 1. As depicted in FIG. 6, the hook material 32 and the loop material 35 are affixed, e.g., by sewing or gluing, onto the strap segments 28 and 30 in the region of their medial ends 43. In use, the hook and loop materials will cooperate as a fastener 53, which will function to join the two strap segments together to form a single strap 12 around the wearer's head.

Referring again to FIG. 1, the eyewear retainer 10 described herein provides several distinct advantages. First, the fastener 53 formed of the hook material 32 and loop material 35 is infinitely adjustable along the entire length of the fastener. This means that the medial ends 43 of the strap segments 28 and 30 can be fastened together so that the eyewear retainer secures the eyewear snugly and comfortably in place on the wearer's head. It will be advantageous if the strap segments are formed of a material having some elasticity, such as Neoprene™. Moreover, the adjustability of the hook and loop fastener means that an eyewear retainer of a single size can accommodate a wide range of wearer's head sizes.

A considerable variety of alternative fasteners could be used in place of the hook and loop materials described herein. For example, one or more hooks, snaps, or buttons could conceivably be used. However, the hook and loop materials have been found to provide a durable and easily adjustable fastener that is economical and convenient to assemble and use. For these reasons, hook and loop materials provide a preferred fastener for removably joining the medial ends of the strap segments together.

As a further important advantage, a hinge 45 is formed at the restriction 44 where the distal end 40 of each strap segment passes through its associated aperture 37. As symbolized by the arrows A in FIG. 1, the flexibility of the strap 12 is much enhanced in the region of this hinge. This has been found to increase the comfort of the eyewear retainer 10 to the wearer by allowing the strap to conform more conveniently to the shape of the wearer's head.

Perhaps even more importantly, the additional flexibility provided by the hinge 45 has been found to significantly decrease any tendency of the seams 52 on the undersides of the distal ends 40 of the strap segments to rotate on the earpieces 23 of the eyewear 25. This rotation has been a significant problem in previous eyewear retainers of this general type, which were not provided with such a hinge. Because the edge and stitches of the seam can be relatively rough, it can be irritating to the wearer if the seam rotates on the earpiece into contact with the side of the wearer's head. The provision of a hinge on the strap segment has been found to greatly reduce any such rotation and largely eliminate this problem.

Although the hinge 45 has been described herein as having been formed by passing an end 40 of the strap segment back through an aperture 37, alternative hinges could be used to the same effect. As used herein, the term "hinge" should be taken to include any means for providing a certain region of the strap with enhanced flexibility in comparison with a region adjacent to the hinge. For example, the strap segment could simply be made narrower in this region or the strap could include a short segment of a highly flexible material in the region of the hinge. However, the hinge as described herein is simple, effective, and economical to form.

Forming a hinge by passing an end of the strap segment back through an aperture in that strap segment can provide yet another advantage. As indicated in the drawings, the strap segments 28 and 30 can be formed of a material having different colors or patterns on the two different sides of the material. One side of the material will be visible in the region of the strap 12 attached to the earpieces 23 of the eyewear 25; the other side of the material will then be visible in the medial portion of the strap. If different colors or patterns are provided on the two sides of the strap, the contrast between the two colors or patterns will create a striking and attractive visual appearance that is quite distinctive in comparison with previously known eyewear retainers of this general type.

A preferred embodiment of an eyewear retainer according to the invention has been described above for the purpose of illustrating the invention. However, modifications and additions could be made to the embodiment described above without departing significantly from the principles of the invention. Therefore, the scope of the invention should be determined primarily with reference to the appended claims, along with the full scope of equivalents to which those claims are legally entitled.

What is claimed is:

1. An improved eyewear retainer of the type including a strap for affixation to the eyewear, the strap adapted to retain the eyewear in place on a wearer's head and having first and second ends, wherein the improvement comprises at least one hinge between the first and second ends of the strap, said hinge comprising a region of the strap in which one end of the strap passes through an aperture defined in the strap between its first and second ends.

2. The eyewear retainer of claim 1, and wherein the material from which the strap is formed has two distinct sides and wherein the two sides have appearances different from one another.

3. The eyewear retainer of claim 1, wherein the strap includes an attachment at the first end, with a top and bottom edge of the strap secured to each other in a region between the aperture and the first end of the strap.

4. An eyewear retainer comprising:
a first strap segment having distal and medial ends;
an attachment near the distal end of the first strap segment, the attachment adapted to secure the first strap segment to the eyewear;
a second strap segment having distal and medial ends;
an attachment near the distal end of the second strap segment adapted to secure the second strap segment to the eyewear;
a fastener for joining the first and second strap segments to one another in the region of their medial ends; and
at least one hinge on at least one of the strap segments between the distal and medial ends of the strap segment, wherein said hinge comprises a region of the strap segment in which one end of the strap segment passes through an aperture defined in the strap segment between its distal and medial ends.

5. The eyewear retainer of claim 4, and wherein at least one of the strap segments is formed of a material that has two sides and wherein the two sides have appearances that differ from one another.

6. The eyewear retainer of claim 4, and wherein the fastener comprises detachable hook and loop materials disposed between the medial ends of the first and second strap segments and configured to join the first and second strap segments to one another.

7. The eyewear retainer of claim 4, wherein the attachment near each distal end includes a top and bottom edge of the strap secured to each other.

8. A method for making an eyewear retainer, the method comprising:
providing a strap having two ends with an attachment at each end for securing the strap to the eyewear; and
providing the strap with at least one hinge disposed between the two ends of the strap, including passing an end of the strap through an aperture formed in the material of the strap between the two ends of the strap.

9. The method of claim 8, and wherein providing the strap with an attachment at each end includes securing a top and bottom edge of the strap to one another in a region between the aperture and the end of the strap.

10. The method of claim 8, and further comprising providing the strap with an adjustable fastener whereby the effective length of the strap can be adjusted.

11. The method of claim 8, and further comprising:

selecting a material for the strap, wherein the selected material has two sides and wherein the two sides have appearances that differ from one another.

* * * * *